May 12, 1964   J. W. HORTON   3,133,199
VAPOR CELL LIGHT AMPLIFIER
Original Filed July 22, 1959   4 Sheets-Sheet 1
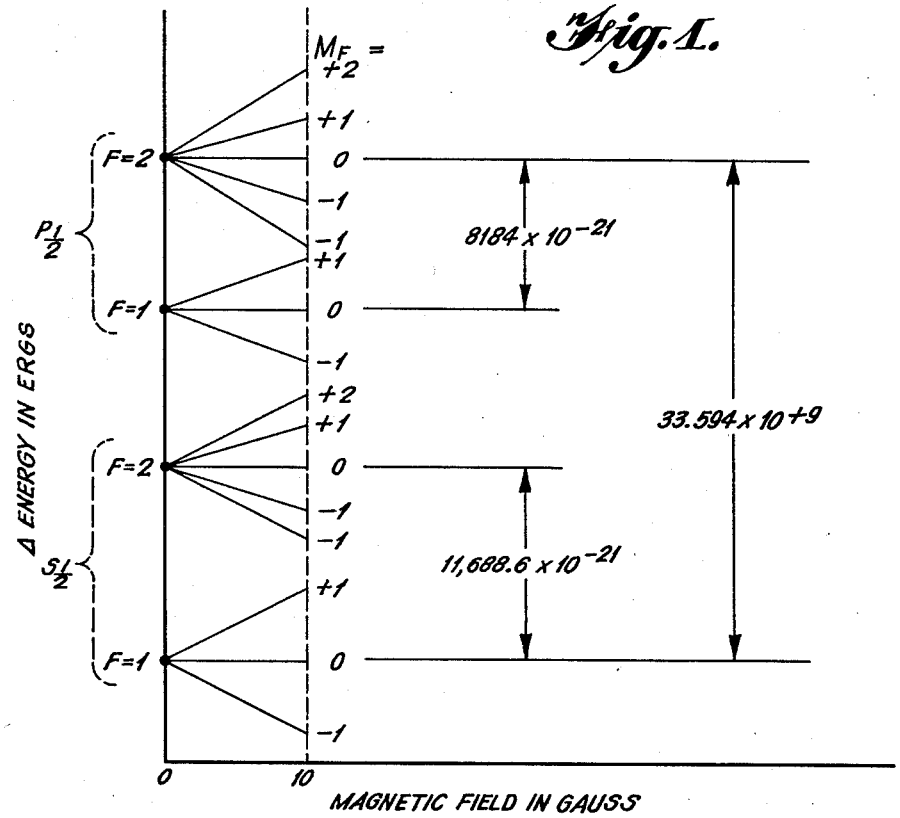
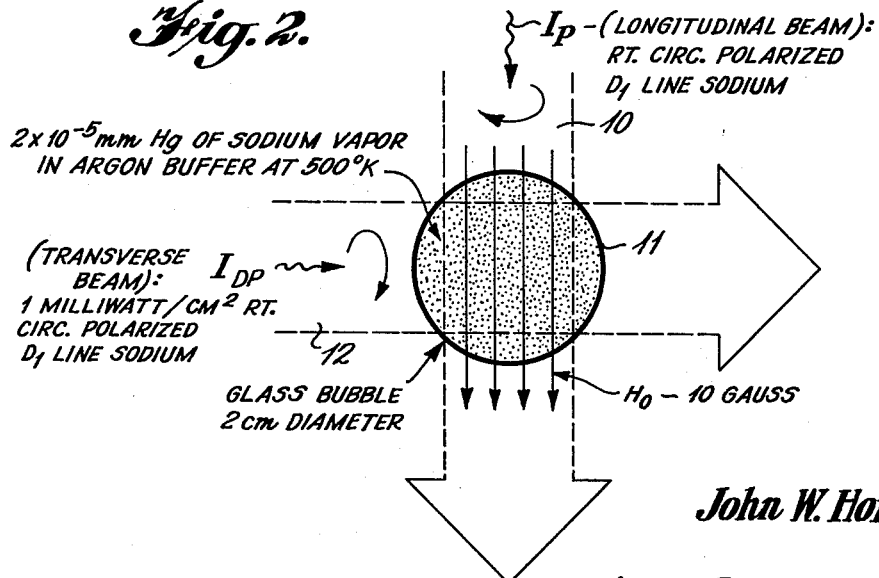
INVENTOR
John W. Horton
BY
ATTORNEYS May 12, 1964

J. W. HORTON 3,133,199

VAPOR CELL LIGHT AMPLIFIER

Original Filed July 22, 1959

INVENTOR
John W. Horton

BY Sughrue Rothwell Mion & Zinn

ATTORNEYS

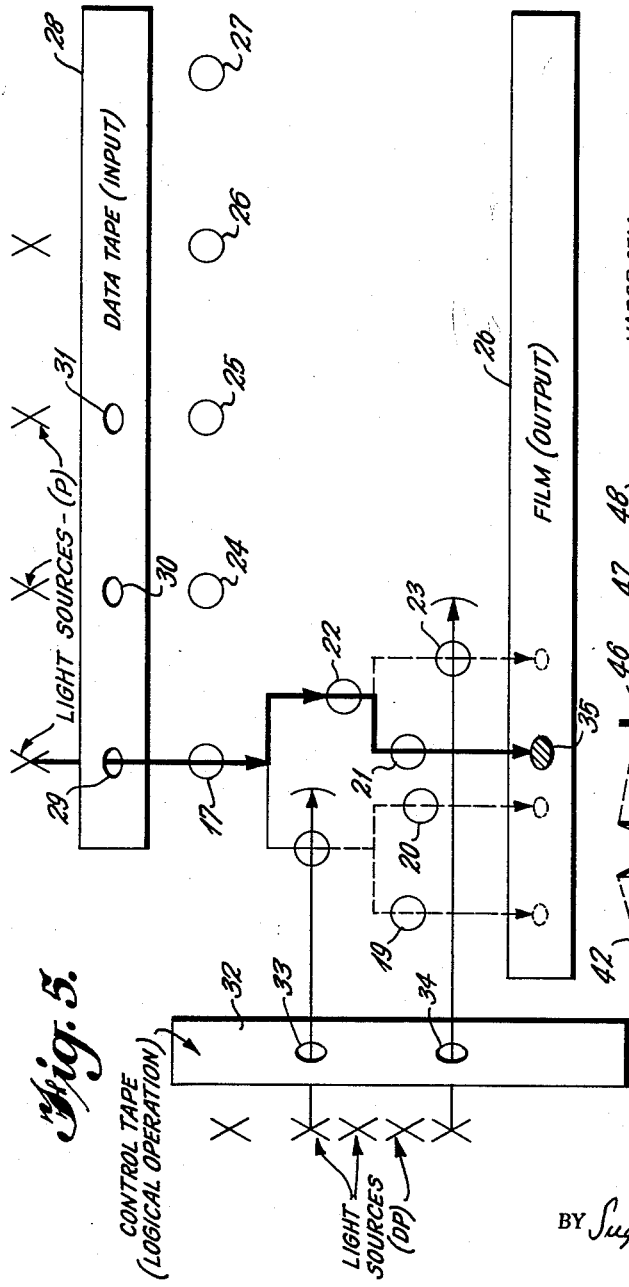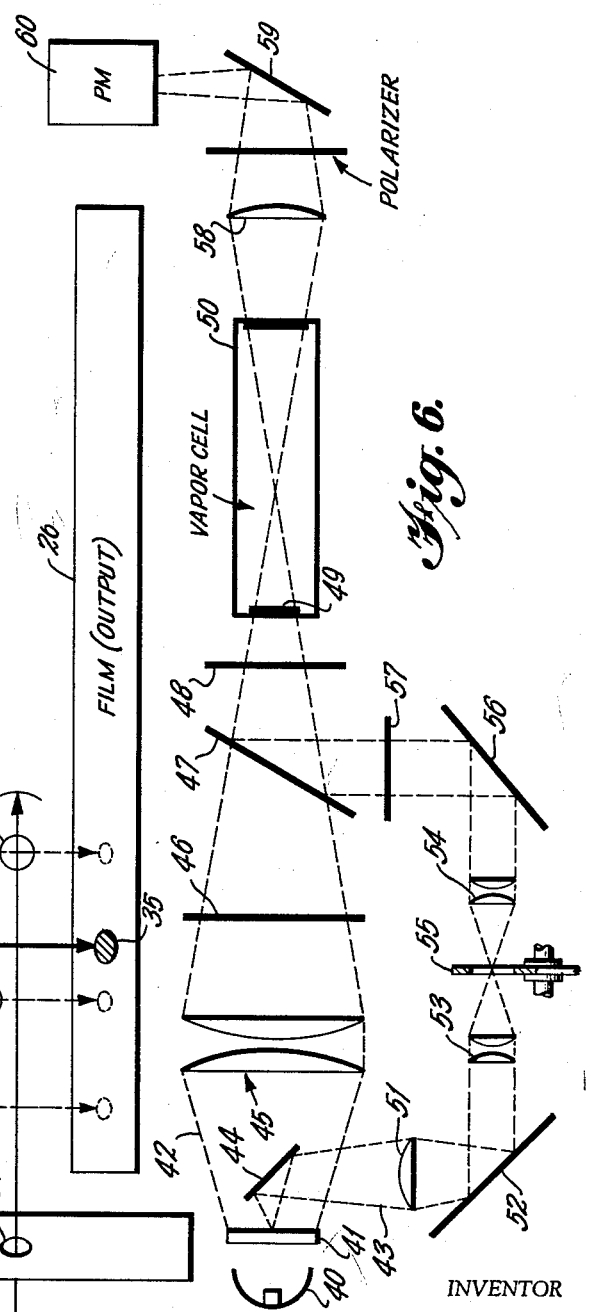

May 12, 1964  J. W. HORTON  3,133,199
VAPOR CELL LIGHT AMPLIFIER
Original Filed July 22, 1959  4 Sheets-Sheet 4
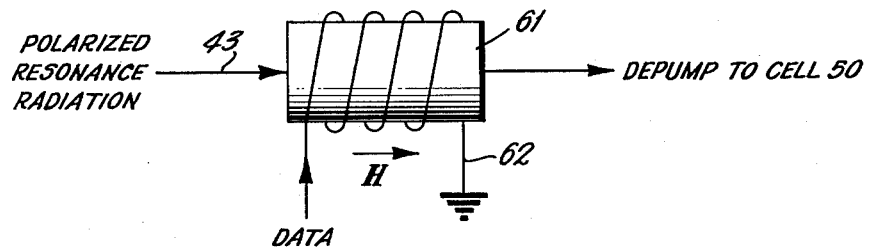
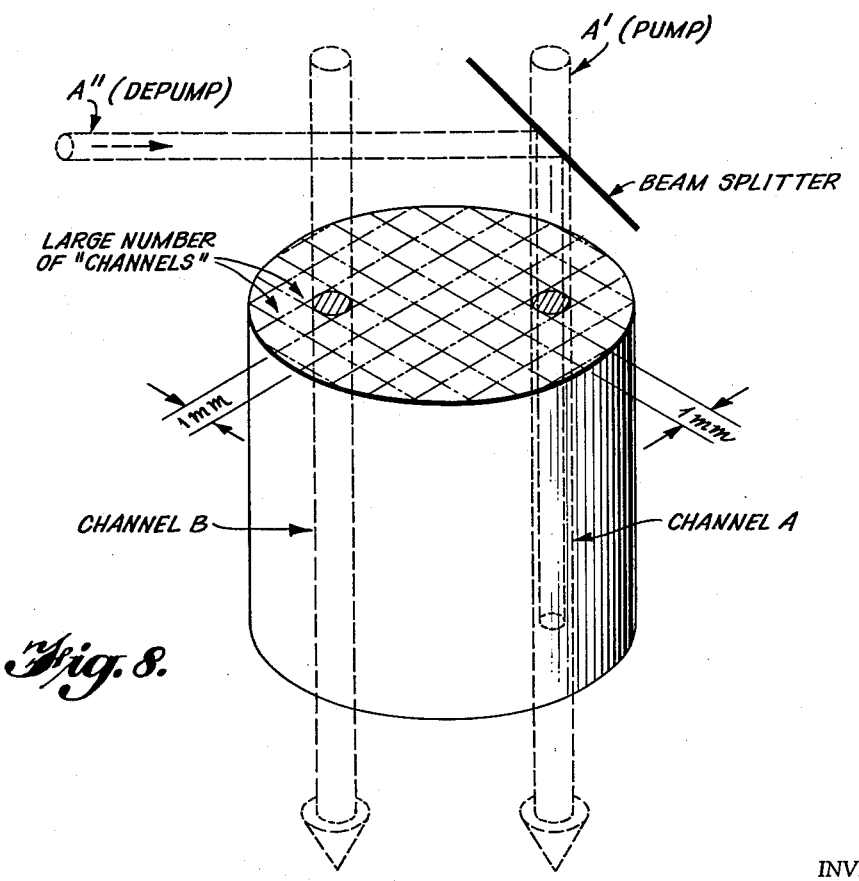
INVENTOR
John W. Horton
ATTORNEYS United States Patent Office 3,133,199
Patented May 12, 1964

3,133,199
VAPOR CELL LIGHT AMPLIFIER
John W. Horton, New York, N.Y., assignor to International Business Machines Corporation, New York, N.Y., a corporation of New York
Original application July 22, 1959, Ser. No. 828,908, now Patent No. 3,098,112, dated July 16, 1963. Divided and this application Oct. 9, 1962, Ser. No. 234,273
7 Claims. (Cl. 250—213)

This invention relates to an optical device that provides light amplification and finds additional utility as a logical device. The invention also relates to systems employing said device.

This application is a division of application Serial No. 828,908, filed July 22, 1959, now U.S. Patent No. 3,098,-112, granted July 16, 1963.

In the prior art, light amplification has usually been accomplished by conversion of light energy into electrical energy, amplification of the electrical energy and reconversion of the amplified electrical energy to light energy. The present invention however, eliminates the intermediate conversion to electrical energy, and performs the amplification more directly via the action of one light beam upon the properties of a material medium which controls the transmission of a second light beam. The means by which this is accomplished involves illumination of a vaporous medium with beams of electromagnetic radiations. A correlated functioning of such a device is that of a logical element. In the continuing presence of a single beam, identified as the pumping radiation, the medium is rendered excessively translucent to the pumping radiation but in the presence of two beams, namely, a pumping radiation and a de-pumping radiation, the medium is restored to a more nearly normal condition of the vapor which is relatively opaque to the pumping rediation. It can be seen then that the vapor is either opaque or translucent as a function of the presence or absence of the de-pumping radiation. This provides its function as a logical device. Additionally, in accordance with this invention, small modulations of the de-pumping radiation provide large modulations of the pumping radiation to exhibit the light amplifying qualities of this invention.

It is, therefore, one object of this invention to provide an optical device which exhibits light amplification.

It is also an object of this invention to provide an optical device which has particular utility as a logical element.

Further objects of the invention include the use of this device in systems including light amplification and/or optical logic.

These and other objects will become apparent from a detailed description and the accompanying drawings.

In the drawings:

FIG. 1 is a chart plotting Δ energy as ergs against magnetic field in gauss showing Zeeman splitting of the two hyperfine states for the ground and excited states of sodium vapor;

FIG. 2 is a diagrammatic representation of one form of light cell constructed in accordance with this invention;

FIG. 5 is a diagrammatic representation of a means of direct processing of light information constructed in accordance with this invention;

FIG. 6 is a diagrammatic representation of an optical system employing a light cell constructed in accordance with this invention in which the pumping and de-pumping radiations enter said cell in parallel.

FIG. 7 is a diagrammatic representation of one means of converting electronic data into light data by modulation of the de-pumping radiation; and FIG. 8 is a diagrammatic representation of another form of light cell constructed in accordance with this invention.

Figure 3:
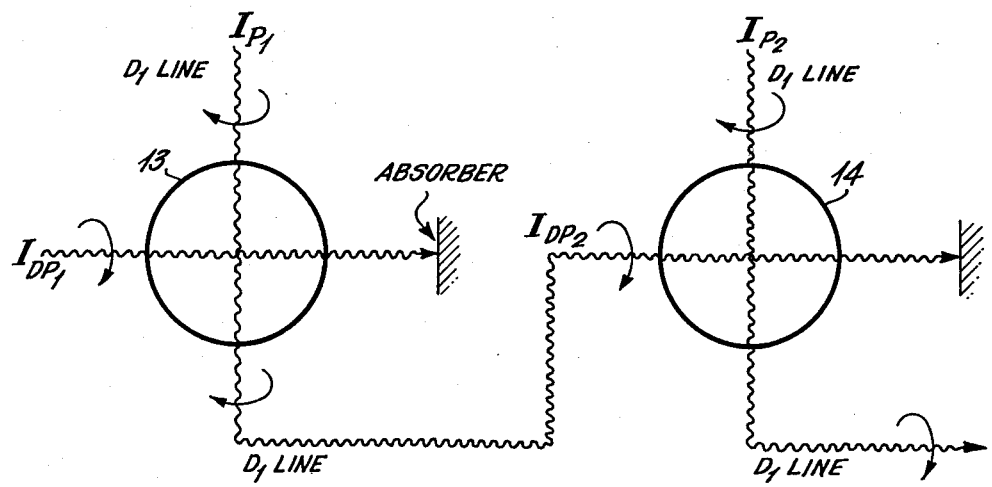
FIG. 3 is a diagrammatic representation of two light cells constructed in accordance with this invention and coupled to form a photon-valve amplifier.

Referring first to FIG. 1, there is shown a plot of energy in ergs versus static magnetic field in gauss, for sodium atoms in a vapor state. At magnetic ground (0 gauss) the sodium atoms are in the ground state ($S_{1/2}$) and are divided between two hyperfine states, $F=2$ and $F=1$. F is a measure of the total angular momentum vector of the atom which is expressed by the classical formula:

$$F=I+J$$

Where I is the vector representing the spin angular momentum of the sodium nucleus and J is the vector representing the total angular momentum of the planetary electrons. In quantum mechanics, the relation between F, I, and J is that $F=(I+J)$, $(I+J-1)$, ... $(I-J)$. When F, I, and J are now quantum numbers which are measures of the respective angular momenta just mentioned. The value of I in this particular case is $3/2$ and that of J is $\frac{1}{2}$, giving the two hyperfine states where $F=2$ and $F=1$. In the $S_{1/2}$ ground state, the total orbital angular momentum (L) of all the sodium electrons is zero, that is, the electrons oscillate to and fro requiring a passage thereof through the nucleus. Since all the electrons in sodium are paired off in electron spin except for a single outermost valence electron, the total angular momentum of electrons of the sodium atom J is according to the quantum mechanical rule $J=(L+S)$, $(L+S-1)$ ... $(L-2)=(0+\frac{1}{2})=\frac{1}{2}$ In the ground state there are five atoms out of every eight in $F=2$ hyperfine state and the three remaining atoms in the $F=1$ hyperfine state. By the application to the vapor of relatively weak static magnetic field, in the order of about ten gauss, Zeeman splitting of the hyperfine states takes place. The $F=2$ hyperfine state atoms oriented one each into five magnetic sublevels, identified as $M_F=+2, +1, 0, -1$ and $-2$, and the $F=1$ hyperfine state atoms are oriented one each into the three magnetic sub-levels $M_F=+1, 0, -1$ where $M_F$ is the magnetic quantum number. If now the vapor is subjected to a beam of pumping radiation such that sub-level transitions of the atoms take place in accordance with the absorption selection rule $\Delta M_F=+1$, said transitions taking place between the ground state and the excited state ($P_{1/2}$) by absorption of a photon from this radiation by the atom, the excited atom will jump to a sub-level in the excited state governed by this selection rule. In the case of sodium vapor such a resonance pumping radiation is the $D_1$ sodium line, right circularly polarized relative to the magnetic field and directed parallel to it. Its frequency is $5.09 \times 10^8$ megacycles and when multiplied by Planck's constant ($6.6 \times 10^{-27}$) provides the necessary $$33.594 \times 10^{-19}$$

ergs of energy required to jump a sodium atom from the ground to the excited state. The difference in energy level $F=2$ and energy level $F=1$ in the ground state is $11,688.6 \times 10^{-21}$ ergs, corresponding to a frequency of 1771 megacycles and in the P state the difference between these two hyperfine states is $8184 \times 10^{-21}$ ergs, or 124 megacycles.

Under the influence of the resonance pumping radiation, an atom will jump, for instance, from the $M_F=0$ sub-level in the ground state to the $M_F=+1$ sub-level in the excited state. This is in accordance with the previously cited selection rule for adsorption. However, the selection rule for emission is different. This selection rule is as follows:

$$\Delta M_F = 0, +1, -1$$

Therefore, upon emitting its energy in the excited state, the atom which had been jumped from the ground state to the excited state and into sub-level $M_F = +1$ can return to one of three sub-levels in the ground state, namely $M_F = +1$, $M_F = 0$, or $M_F = +2$. All of the sub-levels in the ground state, with the exception of the sub-level $M_F = +2$, are absorbing to the resonance pumping radiation. This latter sub-level is non-absorbing to the pumping radiation. There is no excited state sub-level to which an atom may jump from the $S_{1/2}$; $M_F = +2$ level, since there is no $P_{1/2}$ state sub-level $M_F = +3$, which of course there would have to be in order to satisfy the absorption selection rule. Therefore, the sub-level in the ground state $M_F = +2$ traps all atoms which by their transitions between the ground and the excited state and back again, land therein. On the average seven photons from the pumping radiation are required to position a sodium atom in this non-absorbing sub-level of the ground state. Eventually then, substantially all of the atoms populate this non-absorbing sub-level in the ground state. This is the only non-absorbing sub-level to the pumping radiation in the ground state, all of the other sub-levels being absorbing thereto. Therefore, under the conditions where each of the sub-levels in the ground state are substantially equally populated, the pumping radiation is substantially diminished in intensity due to the relative opacity of the medium to it because of the absorption from the radiation of its photons by the atoms in the absorbing sub-levels. Ultimately, however, upon substantially 100% orientation of the atoms in the non-absorbing sub-level ($M_F = +2$) the incident intensity of the pumping radiation is substantially regained at the exit end of the cell. The vapor then becomes substantially translucent—and excessively so—to the pumping radiation.

Now, if there is applied to the medium a second beam of electromagnetic energy, identified as the depumping radiation, which second beam causes transitions in accordance with the selection rule differing from $\Delta M_F = +1$, then the non-absorbing orientation will be destroyed. The non-absorbing sub-level will become substantially depopulated and then the medium again becomes relatively opaque to the transmission therethrough of the pumping radiation. It must be noted that whereas before it required the absorption of seven photons per atom to cause transitions into the non-absorbing sub-level, the transition from the non-absorbing to an absorbing sub-level required only a single photon per atom. Consequently, it can be seen that by a relatively small modulation of the de-pumping radiation, a relatively high modulation of the pumping radiation is obtained. Therefore, this particular device exhibits true light amplification. It may be noted that the presence of the de-pumping radiation causes a large diminution of the pump radiation. This is amplification with a 180° phase reversal, analogous to that produced by the triode vacuum tube.

Turning to FIGURE 2, there is shown a schematic of a device constructed in accordance with this invention. The pumping radiation 10 obtained from a suitable source is a right circularly polarized $D_1$ line of sodium propagated in a direction parallel to the magnetic field $H_0$. The de-pumping radiation enters the vapor cell 11 at right angles thereto, the de-pumping radiation being identified by the numeral 12. The vapor within the cell is sodium vapor in argon buffer gas at 500° K. and at a pressure of $2 \times 10^{-5}$ mm. Hg. Under the conditions outlined above, provided the intensity of the pumping radiation equals the intensity of the de-pumping radiation, the ratio of intensity of the pumping radiation entering the cell ($I_P$) IN compared to that of the pumping radiation leaving the cell ($I_P$) OUT is approximately 10 to 1. The photon gain, when the de-pumping radiation intensity is about ½ of that of the pumping radiation, is between 1, 3 and 2.

So it can be seen that the device functions as a logical element having two states, namely, an opaque and a translucent state, depending upon the presence of one or two of the radiations, and also exhibits photon gain.

Referring to FIGURE 3, there is shown a photon-valve amplifier chain showing the compatability of a plurality of these units, which is very much the same as the compatability of vacuum tubes which are arranged in cascade. If we connect two of the cells, as shown in FIGURE 2 in cascade as shown in FIGURE 3, it can be seen that the photon gain achieved by the pumping radiation $I_{P1}$ within the cell 13 can be applied as the de-pumping radiation $I_{DP2}$ in cell 14. A small modulation of the de-pumping radiation $I_{DP1}$ will provide a relatively greater modulation of the pumping radiation $I_{P1}$. This larger modulation applied to cell 14 as the de-pumping radiation $I_{DP2}$ will produce a still further increase in modulation of the pumping radiation $I_{P2}$. The output would then be characteristic of the amplification factors of the two cells 13 and 14. The means by which the radiations are coupled between cells is by an conventional optical means which will preserve the polarization of the coupled beams.

Figure 4:
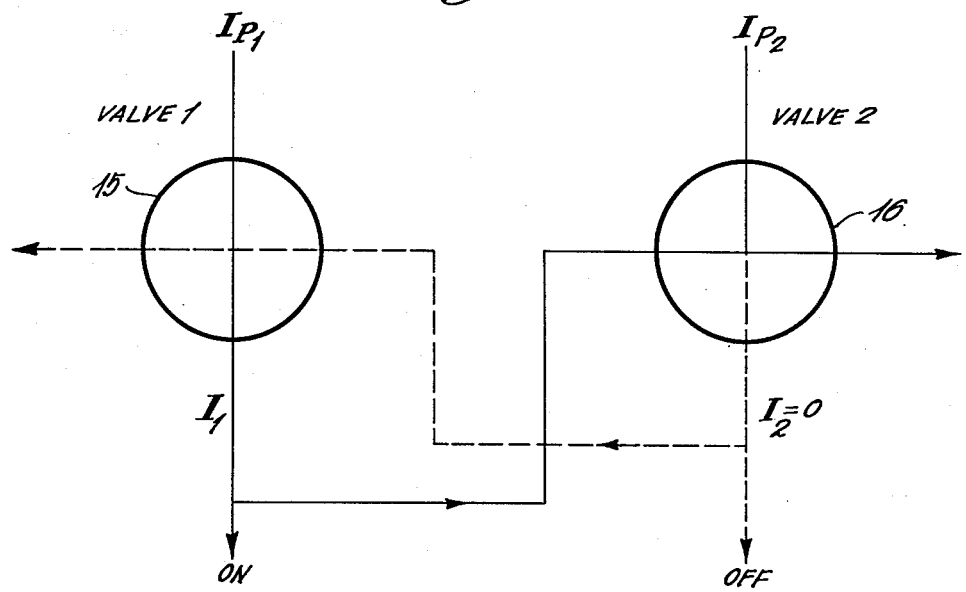
FIG. 4 is a diagrammatic representation of the coupling of two light cells constructed in accordance with this invention functioning as a flip-flop.

Referring to FIGURE 4, there is shown a photon-valve flip-flop which is comparable to a vacuum tube flip-flop and functions as a storage cell having an on and off or binary 1-binary 0 condition. As shown in this figure, upon the application to the respective cells of pumping radiation $I_{P1}$ and pumping radiation $I_{P2}$, cell 16 is in the off condition and cell 15 is in the on condition. The output from cell 15, $I_1$, is fed to cell 16 as the de-pumping radiation to make this cell substantially opaque to the pumping radiation. Consequently, $I_2$ at the output of cell 16 is equal to substantially zero, and provides no de-pumping radiation to cell 15. Consequently, cell 15 is substantially translucent to the pumping radiation $I_{P1}$. However, should, for instance, momentarily $I_{P1}$ be shut off, while $I_{P2}$ remains on, the opposite conditions would prevail. In this case, $I_1$ would be equal to zero, providing no de-pumping input to cell 16. Therefore, the pumping radiation $I_{P2}$ in cell 16 would provide an output $I_2$ equal to some value. Therefore, cell 16 would be on and cell 15 would be off.

Turning now to FIGURE 5, there is shown a system for the direct processing of light information. The light sources for the pumping radiation (P) and for the de-pumping radiation (DP), are indicated by the X's. The various cells are indicated at 17 to 27, inclusive. The data tape is identified by numeral 27. It has a plurality of data punches indicated at 29, 30 and 31. The control tape 32 has a plurality of punches therein indicated at 33 and 34. For example, there is shown the routing of information indicated by punch-hole 29 to position 35 on the film 36. Cell 17 because of a lack of coincidence of radiations is translucent. The output from cell 17 is fed to cells 18 and 22. Because of the coincidence of radiations in cell 18, this cell is opaque to the pumping radiation and provides no output to cells 19 and 20. However, because of the lack of coincidence of radiations in cell 22, the pumping radiation provides an output therefrom which is fed to cells 21 and 23. In this particular case, because of the control tape punch-hole at 34, cell 23 has a coincidence of radiations therein and is opaque to the pumping radiation, while cell 21 has a lack of coincidence of radiations therein and is translucent. Therefore, the output of the pumping radiation from cell 21 is recorded at position 35 on the film 36. By moving the control tape in conjunction with the data tape, the data can be switched to any particular position on the film 26 as determined by the control tape. While we have here shown a particular shape of punch, that is, a circle, on the data tape and control tape, other shapes may be employed. For instance, these holes may be replaced by negative containing images thereon, thus shaping for instance the pumping radiation. In this event, it is quite clear how this image of the negative can be transferred under the control of the control tape to a particular point or points on the film strip 36. Additionally, the control tape may have a particularly shaped aperture, created by a negative to superimpose the image of the control tape onto the image of the data tape to provide a composite output of the film 36.

As can be seen if the control tape had a hole only at position 34, then the image of 29 could be switched through cells 19 and 20 in addition to cell 21. So it is possible with this arrangement to not only pick one particular place on the output to store the data but a plurality of selected positions may be obtained. As referred to above, in the case of negatives having images thereon in place of the holes these negatives may carry, for instance, alpha or numeric characters. The control tape might carry the image of a business form.

What has thus far been illustrated is the use of a sodium vapor as the vapor within the light cell, but the invention is not so limited. Other vapors may be substituted. These include all of the alkali vapors and gases such as helium and hydrogen. Other such media are known in the art. Generally speaking, the vapor or gas should have the following characteristics:

(1) A ground state (includes metastable state of a gas).

(2) An excited state.

(3) The vapor or gas must exhibit splitting into a plurality of Zeeman levels upon the application thereto of a magnetic field.

(4) One of the levels must be a photon non-absorbing level to the pumping radiation, or there must be at least one level which can be preferentially occupied and which has an average absorption less than the average of all the ground state levels.

Additionally, we have illustrated as the pumping radiation only the $D_1$ sodium line. However, other sources may be used. Such sources are known in the art. The radiation must for all practical purposes be a resonant radiation, that is, in resonance with the vapor employed, and must cause Zeeman transitions between the magnetic sub-levels and these transitions may take place in accordance with the absorption selection rule $\Delta M_F = +1$ as in the case of right circularly polarized radiation, or $\Delta M_F = -1$ as in the case of left circularly polarized radiation. In other words, the pumping radiation must be a resonance radiation and must pump the atoms of the vapor into a Zeeman level which is non-absorbing to it.

The de-pumping radiation should be a radiation which does not obey the same selection rule as the pumping radiation, so that the level which is non-absorbing to the pumping radiation is absorbing to the de-pumping radiation, or if it does obey the same selection rule, then its frequency must be different. For example a right circularly polarized $D_2$ line would obey $M_F = +1$ and would de-pump because it jumps the atom into a magnetic sub-level in which $M_F = +3$ occurs. For maximum de-pumping action, the de-pump should be resonant, although it need not be.

One particular example has been given in FIGURE 2. This involves the use of a pumping radiation of the $D_1$ line of sodium and a de-pumping radiation of the same character. The pumping radiation was propagated through the cell at right angles to the de-pumping radiation. This angular difference was sufficient to provide that the absorption selection rule for the pumping radiation was different from that of the de-pumping radiation, that of the pumping radiation being $\Delta M_F = +1$ since it was a right circularly polarized beam with a direction of propagation parallel to the magnetic field applied. As long as there is this angular difference in direction of propagation with this relation observed between field direction and direction of propagation of pumping radiation, the cell will function properly. However, if we assume two radiations of different characteristics the angular relationship need not be observed. Reference for such a species is made to FIG. 6.

Referring to FIG. 6, the microwave horn 40, which may be a so-called Raytheon microtherm unit, excites a rubidium quartz lamp 41 to provide a rubidium spectrum beam. This beam is divided into two parts 42 and 43 by a reflector 44. Beam 42 is directed by lens system 45 through the circular polarizing sheet 46. Let it be assumed that this beam is right circularly polarized thereby. It then passes through the beam splitter 47 to the interference filter 48. This filter 48 prevents all but the resonance radiation line of the spectrum from entering through window 49 of cell 50. The cell contains rubidium vapor.

The beam 43 passes through lens system 51 to reflector 52 and thence through the chopper assembly including lenses 53 and 54 and mechanical chopper 55 where said beam is modulated. The modulated beam is reflected by reflector 56 through left circular polarizing sheet 57 to the beam splitter 47 and thence through filter 48 and window 49 into the cell 50.

The output of the cell 50 from the exit window 62 is directed by lens 58 and reflector 59 to the photomultiplier 60. The photomultiplier detects the output of the vapor cell 50 and indicates the modulations induced by the chopper.

Here then is an example of parallel entry of both beams. A weak static magnetic field, not shown, is applied to the cell with the field direction parallel to the direction of propagation of the beams. The beam 42 may be considered to be the pumping radiation and beam 43 the de-pumping radiation. The former may be right circularly polarized or left circularly polarized depending upon the direction of the magnetic field and the latter is oppositely polarized thereto.

Referring to FIG. 7, there is shown a substitute for the chopper. In this particular case, after beam 43 has been properly polarized by a polarized sheet (not shown) it may enter another vapor cell 61. Again a weak static magnetic field is applied thereto having a field direction parallel to the direction of propagation of the beam 43. A coil 62 is provided to which is fed the electronic data used to modulate the radiation 43 in the cell 61. This is accomplished by the action of the magnetic field in the following manner: Let us assume that with a magnetic field (H) pointing to the right in FIGURE 7 and with the incident light right circularly polarized, the vapor is pumped into the non-absorbing level $F=2$, $M_F=2$ and is thereby rendered excessively translucent. When the magnetic field is reversed, the magnetic quantum number is now $M_F = -2$ because the angular momentum vector of the atom has been turned the other way; now absorption can occur according to the selection rule $\Delta M_F = +1$; more simply, pumping occurs relative to a given direction of the magnetic field; reverse the field and pumping radiation becomes de-pumping radiation. The output of the cell 61 is fed to the vapor cell 50 as the de-pumping radiation. Here we have, of course, assumed that the beam 43 prior to entrance to the cell 61 has been properly polarized and filtered so that it is in resonance with the vapor within the cell 61. FIG. 7 is then an example of direct conversion of electronic data into optical data for employment in the system of the present invention.

Another example of parallel entry of pump and de-pump is shown in FIGURE 8. The generally cylindrical elongated cell 65 may be imagined to be divided into a number of channels which function as individual light cells extending axially of the cell. Let it be assumed that each channel is 1 mm. x 1 mm. Then in 1 square inch we have $25 \times 25 = 625$ channels. Each channel, actually the vapor contained in a channel, may be regarded as a relay in the following sense: Let pump A' be turned on through channel A. At first nothing comes out of the cell (relay open), then the pumping action sets in and the vapor becomes excessively translucent (relay closed and stays closed by presence of input signal). Next, support we pass de-pump A" through channel A; this cuts off output (relay is opened by de-pump). A plurality of photomultipliers as shown in FIGURE 6 may be positioned at the output end of each channel to determine the condition of the relays. So we have here 625 relays. These relays can operate at speeds around 1 to 2 kc.

When an atom has been trapped in the non-absorbing level its movement in the cell may cause it to collide with the walls thereof. By virtue of this collision it may lose its spin and become absorbing to the pumping radiation. This has two deleterious effects; (a) for given pumping light intensity the vapor is less translucent and (b) to achieve a desired degree of translucency (say 90%) the pumping radiation would have to be increased to compensate for the de-pumping effect of the wall. To decrease this probability and to thereby increase the relaxation time of the atoms, two supplemental techniques may be employed. First, a buffer gas of neutral characteristics may be employed. The rare gases such as argon, neon, etc. are examples. Secondly, the walls may be coated with a saturated long chain hydrocarbon having all of its electrons paired off. Such an example is polyethylene. By employing these techniques the lifetime of an atom in the non-absorbing level is substantially increased, perhaps by a factor of $10^6$ as compared to a cell having no such coating or containing no buffer gas. Preferably the cell walls are translucent to allow escape of random light. The windows are ground and stress annealed so that they provide no depolarizing effect on the radiations.

What has been shown and described are specific embodiments of the present invention. Other embodiments obvious to those skilled in the art from the teachings herein are contemplated to be within the spirit and scope of the following claims.

What is claimed is:

1. An optical two-state device comprising two light cells each having a light medium therein adapted to split into a plurality of Zeeman magnetic sub-levels, a magnetic field for application to the media of each of said cells to cause said splitting, a pumping radiation associated with each of said cells for illuminating said medium therein and for pumping the atoms of said medium into a Zeeman sub-level relatively non-absorbing thereto whereby said sub-level becomes highly populated, means to cross couple the output pumping radiation from each of said cells to function as the input de-pumping radiation to each of said cells, said depumping radiation depopulating said non-absorbing sub-level and means to control at least one of said input pumping radiations.

2. An optical two-state device comprising two light cells each having a light medium therein adapted to split into a plurality of energy levels, a source of pumping radiation associated with each of said cells for illuminating said medium therein and for pumping the atoms of said medium into an energy level relatively non-absorbing thereto whereby said energy level becomes highly populated, means to cross-couple the output pumping radiation from each of said cells to function as the input de-pumping radiation to each of said cells, said de-pumping radiation de-populating said non-absorbing energy level and means to control at least one of said input pumping radiations.

3. The optical two-state device recited in claim 2 wherein said medium is one selected from the group comprising helium, hydrogen and the alkali vapors.

4. An optical two-state device comprising two light cells each having a light medium therein adapted to split into a plurality of Zeeman magnetic sub-levels, means for applying a magnetic field to the medium of each of said cells to cause said splitting, a source of pumping radiation associated with each of said cells for illuminating said medium therein and for pumping the atoms of said medium into a Zeeman sub-level relatively non-absorbing thereto whereby said sub-level becomes highly populated, means to cross-couple the output pumping radiation from each of said cells to function as the input de-pumping radiation to the other of said cells, said de-pumping radiation de-populating said non-absorbing sub-level and means to control at least one of said input pumping radiations.

5. The two-state optical device recited in claim 4 wherein the direction of said magnetic field is the same as the direction of propagation of said pumping radiation.

6. An optical two-state device comprising two light cells each having a light medium therein, said medium having the following characteristics:
  (1) a ground state,
  (2) an excited state,
  (3) exhibits splitting into a plurality of Zeeman levels upon the application to said medium of a weak static magnetic field,
  (4) one of said levels is a photon relatively non-absorbing level to a pumping radiation, means providing a weak static magnetic field for application to said medium to cause said splitting, a source of a beam of pumping radiation for illuminating said first light cell, a source of a beam of pumping radiation for illuminating said second cell, both of said sources of pumping radiation causing Zeeman transition of substantially all of the atoms of said medium to said non-absorbing level whereby said non-absorbing level becomes highly populated and said medium becomes translucent to said pumping radiation, means to cross-couple the output pumping radiation from each of said cells to function as the input de-pumping radiation to each of said cells, said sources of de-pumping radiation being effective to illuminate the medium of each of said cells to cause said non-absorbing level to become de-populated and said medium to become substantially opaque to said pumping radiation, means to control said radiations, the direction of said magnetic field being the same as the direction of propagation of said pumping radiation, said de-pumping radiations being of substantially identical frequency and direction of polarization, said de-pumping radiation being propagated in the direction at right angles to said field direction.

7. An optical two-state device comprising two light cells each having a light medium therein adapted to split into a plurality of energy levels, a source of pumping radiation associated with the first of said cells for illuminating said medium therein and for pumping the atoms of said medium into an energy level relatively non-absorbing thereto whereby said energy level becomes highly populated, said first light cell providing a light output when said non-absorbing energy level is highly populated, means connecting the light output of said first cell to said second cell to provide a source of pumping radiation thereto, the light output of said first cell pumping the atoms of the light medium in said second cell into an energy level relatively non-absorbing thereto whereby said energy level becomes highly populated, and means for supplying de-pumping radiation to said second cell to depopulate said non-absorbing energy level.

No references cited.